May 9, 1939. L. BERTRAND 2,157,277
BRAKE
Original Filed Jan. 12, 1937 2 Sheets-Sheet 1

INVENTOR:
LUCIEN BERTRAND
BY Haseltine, Lake & Co.
ATTORNEYS

INVENTOR:
LUCIEN BERTRAND
BY Haseltine, Lake & Co.
ATTORNEYS

Patented May 9, 1939

2,157,277

UNITED STATES PATENT OFFICE 2,157,277

BRAKE

Lucien Bertrand, Paris, France, assignor to Société Anonyme Francaise du Ferodo, Paris, France Original application January 12, 1937, Serial No. 120,162. Divided and this application November 24, 1937, Serial No. 176,191. In France February 8, 1936

2 Claims. (Cl. 188—79.5)

The present invention which is a divisional part of the object described in my prior application Ser. No. 120,162, filed January 12, 1937, relates to a brake more particularly intended for motor vehicles of small power and so arranged as to combine various essential qualities one or more of which are lacking in brakes actually in use, viz: lightness, simplicity, low cost price, great ease of adjustment, progressivity of the braking action, and nonexcessive but regular power.

According to the present invention it is possible to obtain at the same time these various qualities by judiciously combining a plurality of known arrangements and certain new arrangements as will be described with reference to the accompanying drawings, given by way of example only.

Figure 1:
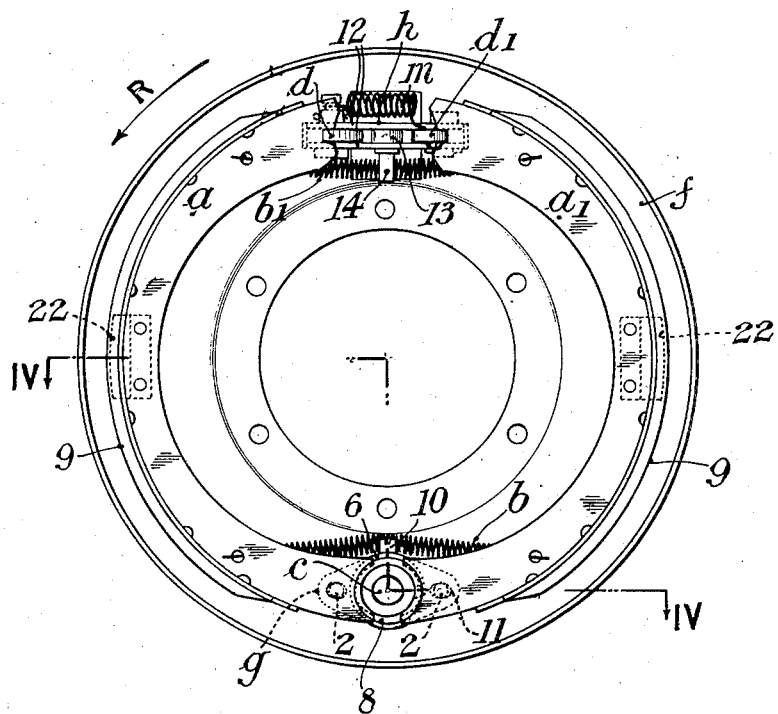
Fig. 1 is an elevation of the brake.
Figure 2:
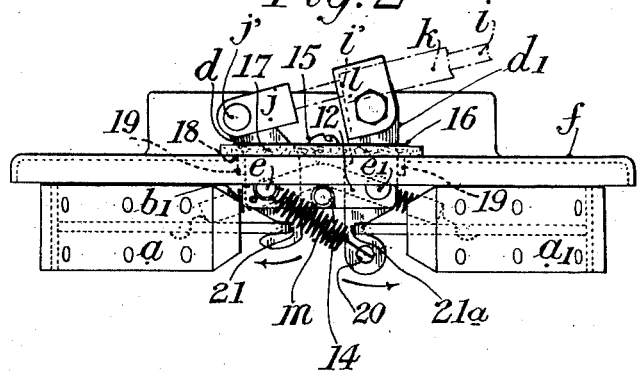
Fig. 2 is a top plan view thereof.
Figure 3:
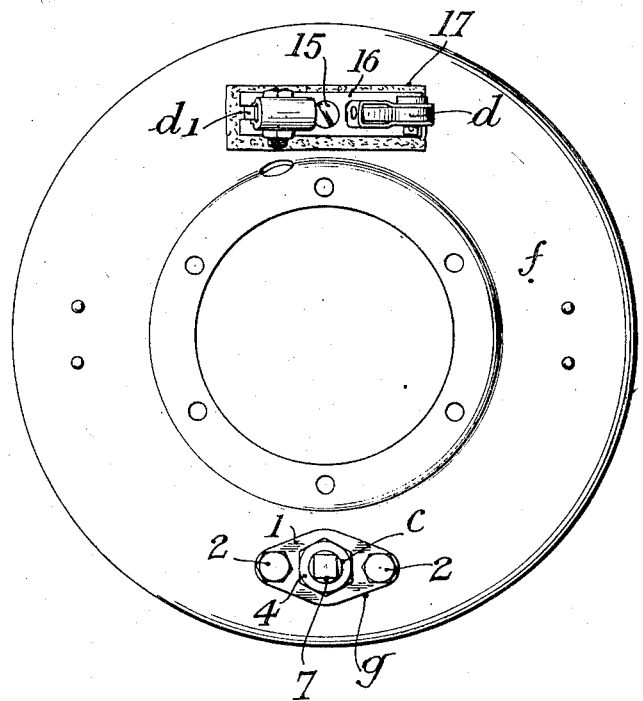
Fig. 3 is an elevation of the same brake seen from the opposite side to the view of Fig. 1.
Figure 4:
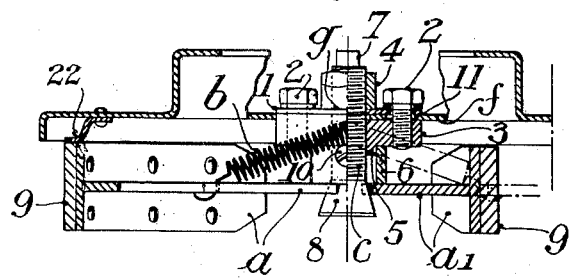
Fig. 4 is a section thereof made according to the broken line IV—IV of Fig. 1.

Two brake shoes $a$, $a_1$, substantially semicircular, and having a T-shaped profile, are urged, by two coil springs $b$, $b_1$, to press, by their V-shaped ends, on the one hand, on a fixed pivot pin $c$ and, on the other hand, on control levers $d$, $d_1$; this pin $c$ and the pivot pins $e$, $e_1$ of levers $d$, $d_1$ are fitted on a fixed plate $f$ through the medium of respective supports $g$ and $h$.

The support $g$ comprises a member or flange $1$ secured on the plate $f$ by two screws $2$ passing through another flange $3$; this member is perforated with a tapped hole in which the pin $c$ is screwed and held stationary by a lock-nut $4$ externally arranged; moreover, it is provided with a flange $5$ on which a ring $6$ is centered. One of the ends of the pin $c$ is so cut as to have sides $7$ and that it can be easily turned by means of a wrench, and its opposite end forms a conical head $8$ serving to hold the shoes $a$, $a_1$ more or less spaced apart when they are at rest, in order to compensate the wear of their friction lining $9$.

The ring $6$ carries a tenon $10$ on which bears the middle portion of the spring $b$, the ends of which are attached to the shoes $a$, $a_1$, so that this spring is bent in V shape and exerts on these latter oblique stresses tending to hold them pressed against the ring $6$ at the same time as on the conical surface of the head $8$.

The ring $6$ is preferably made of a metal the coefficient of expansion of which is such that its variation of axial thickness and, consequently, the variation of diameter of the portion of the conical surface $8$ on which the jaws bear, according as the brake drum (not shown) and, consequently, the ring $6$ itself are more or less heated up, ensure a suitable compensation of the pressure exerted by these shoes against the drum in function of the temperature of the latter.

The holes $11$ provided in the plate $f$ for the passage of the screws $2$ have a diameter larger than that of the screws, so that the position of the support $g$ and of the pin $c$ can be easily adjusted for centering to best advantage the shoes $a$, $a_1$ within the drum.

The support $h$ for the control levers consists in two bent sheet metal members $12$ riveted on the plate $f$ and braced by the pins $e$, $e_1$ and by a median member $13$ which serves, on the one hand, to carry a tenon $14$ similar to the tenon $10$ and, on the other hand, to receive the tightening screw $15$ of an outer plate $16$ adapted to press a felt lining $17$ against the edges of the openings $18$ of the plate $f$ for preventing mud and dust from penetrating about the levers $d$, $d_1$ which pass with play through these openings.

The brake is actuated by means of a Bowden transmission, the cable $i$ of which is attached to a fork-piece $j$ pivoted on the lever $d$ and the sheath $k$ of which presses against a fork-piece $l$ fitted on the lever $d_1$. The levers are normally pressed against abutments $19$ owing to the fact that the shoes $a$, $a_1$ are urged to move towards each other by the springs $b$, $b_1$ and act on the inner ends of the levers $d$, $d_1$, which ends are suitably cut away for receiving them. Moreover, in the present form of construction, the lever $d_1$ is urged in the same direction by a coil spring $m$ attached to an eye member $20$ of this lever and to the pivot pin $e$ of the opposed lever $d$, so as to balance the constant thrust of the sheath $k$ which usually forms several bends.

The tensile stress produced by the rigging is transmitted by the cable $i$ to lever $d$ at $j'$, and, by reaction, the sheath $k$ exerts an equal thrust on lever $d_1$ at $i'$.

Each of the levers transmits this stress amplified in the ratio.

$$\frac{j'\,e}{e-21}$$

for lever $d$, on the shoe $a$, and $$\frac{i'\,e_1}{e_1 21a}$$

for lever $d_1$, on the shoe $a_1$.

The shoes are thus spaced apart by pivoting on the conical portion 8 of the pin c and move in contact with the drum with equal or different stresses according to the purpose for which the brakes are used. In the embodiment illustrated, the stress exerted on the shoe $a$ is smaller than that exerted on the shoe $a_1$, so that in the preferred direction of rotation R of the drum and for a given friction coefficient of the linings 9, the winding effects of the shoe $a$ and the unwinding effects of the shoe $a_1$ produced for the friction torques, allow a strain and wear of the linings substantially equal for both shoes.

The spring $b_1$ is curved on the tenon 14 as the spring $b$ on tenon 13 and also urges the shoes $a$, $a_1$ towards the plate $f$; the movable ends of said shoes are thus pressed against the edges 21 of the notches of the lever and their median portion takes a bearing against seats 22 secured on the plate $f$ by riveting or otherwise. Owing to the fact that each shoe is guided at three points of its length forming a triangle, any rattling and lateral vibrations are completely avoided.

The notches 21, 21$a$ of levers $d$, $d_1$ guide the ends of the shoes and render unnecessary the use of guide links or similar members.

It is to be noted that the mode of attachment of the shoes and springs allows the brake to be fitted up and taken to pieces in a few seconds with the greatest ease. The number of parts to be removed when the linings are to be replaced or when the brake is to be inspected is reduced to the minimum, since it suffices to remove the shoes and springs $b$, $b_1$. No special tool is necessary.

The construction allows of centering the shoes and of adjusting their action with the greatest ease.

The entire brake is light as well as of rugged construction and its cost price is low.

It is to be understood that the invention is not limited to the details of construction indicated above and that the arrangements described can be replaced by any equivalent arrangements without departing thereby from the scope of the present invention.

I claim:

1. In an internal expanding brake, a stationary circular bearing flange, a brake drum concentric to said bearing flange and adapted to rotate relatively to the latter, a pivot-pin with a conical head mounted on said bearing flange and arranged near its circular edge, two opposed semi-circular brake shoes arranged for pivoting about the conical head of said pivot-pin and pressed against this conical head by means of springs, a stationary ring arranged concentric with said conical head, the corresponding ends of said brake shoes being laterally pressed by a spring against said ring, the coefficient of expansion under the action of the heat of said ring being so chosen that the axial displacement of the ends of said brake shoes on said conical head, produced by this expansion, ensures a compensation of the difference of expansion of the brake drum and of the brake shoes.

2. A brake as claimed in claim 1, in which the corresponding ends of said brake shoes are pressed against said ring by one of the springs of these brake shoes, this spring being arranged for passing on a tenon rigid with said ring and being bent in V-shape so as to laterally push said brake shoes against the corresponding end of said ring.

LUCIEN BERTRAND.